United States Patent [19]
Evans

[11] Patent Number: 5,749,776
[45] Date of Patent: May 12, 1998

[54] MEAT DEBONING APPARATUS

[75] Inventor: Daniel R. Evans, Braintree, Mass.

[73] Assignee: Evans Machine Company, Inc., Brockton, Mass.

[21] Appl. No.: 759,842

[22] Filed: Dec. 2, 1996

[51] Int. Cl.[6] .......................... B02C 19/22; A22C 17/00
[52] U.S. Cl. .................................................. 452/138
[58] Field of Search .............................. 452/138, 135, 452/139, 94; 241/74, 82.3, 24; 426/55

[56] References Cited

U.S. PATENT DOCUMENTS

| Re. 32,060 | 12/1985 | McFarland | 452/138 |
| 4,546,927 | 10/1985 | Bloome et al. | 241/74 |
| 5,041,055 | 8/1991 | Roth | 452/138 |
| 5,160,290 | 11/1992 | Richburg | 452/138 |
| 5,213,541 | 5/1993 | Richburg et al. | 452/138 |

*Primary Examiner*—Willis Little
*Attorney, Agent, or Firm*—John P. McGonagle

[57] ABSTRACT

An improved meat deboning apparatus of the horizontally-arranged type, which is linear in a horizontal plane and fully supported by an integral base member throughout its length. Among the improvements made is the elimination of the prior art one-piece feed can and replacement with a split feed can with a replaceable insert. The split feed can of the present invention has a bottom half and a removeable top half. A replaceable insert is contained within. The insert is replaced by removing the top half of the feed can, removing the old insert and replacing it with a new insert. Because the feed can top half is removeable, a one-piece auger may also be used rather than the multiple-sectioned augers required by the pressure housings of the prior art. The thrust bearing and bearinged pillow blocks of the prior art are replaced with spherical roller bearing pillow blocks, thereby eliminating the need for a thrust bearing and its associated housing. The present invention also provides a transfer tube about the perforated housing, i.e., screen, of the prior art.

17 Claims, 5 Drawing Sheets

| FIG. 3A | FIG. 3B |

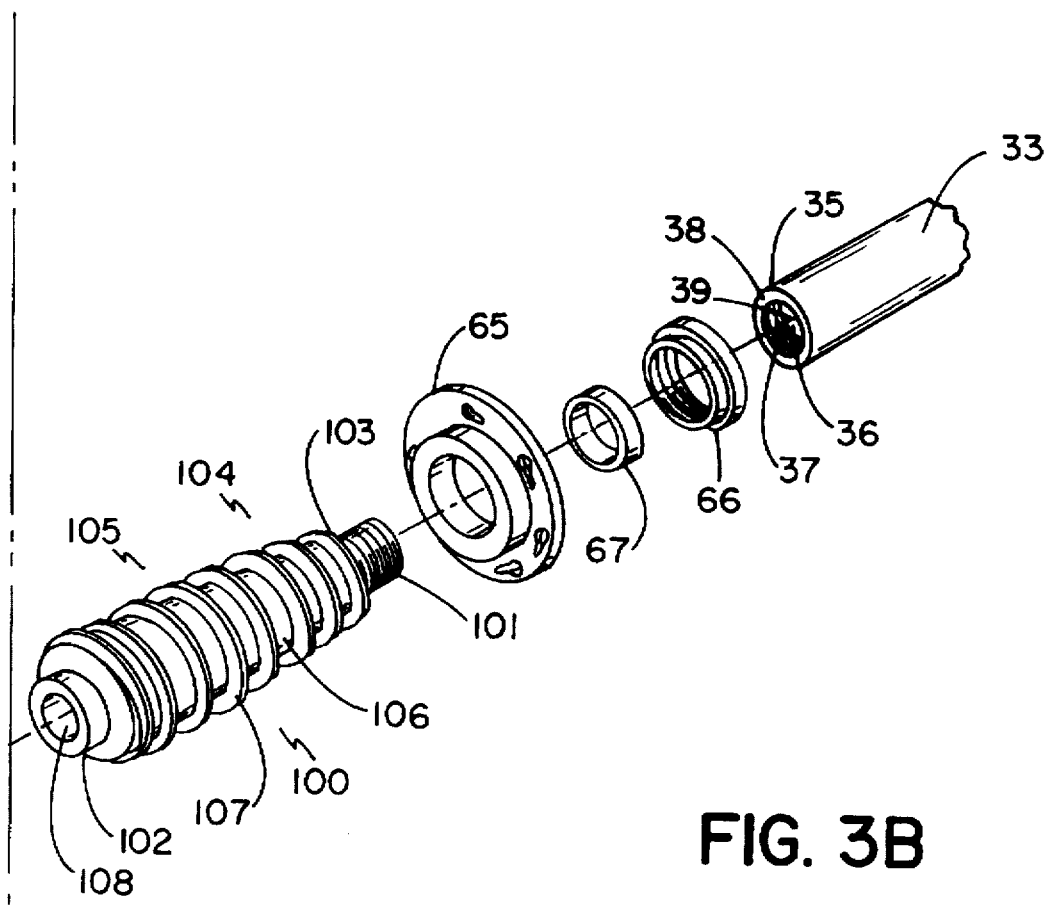
FIG. 3B
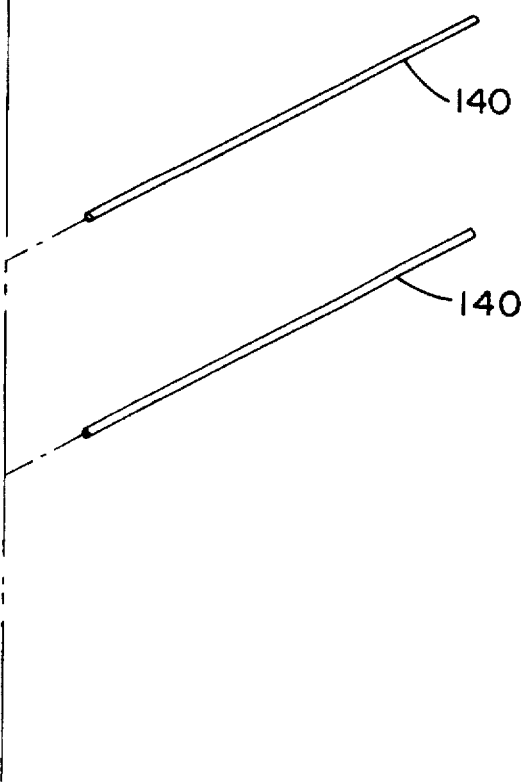

MEAT DEBONING APPARATUS

BACKGROUND OF THE INVENTION

This invention relates generally to the separation of meat from bone in a deboning apparatus, and more particularly to improvements in horizontally arranged meat deboning apparatus.

A variety of prior art devices have been available for use in the separation of one component from another particularly in the food processing industry. The use of combinations of cylindrical screens and helicoidal drive screws (augers) for straining meat from bones. Deboning machines are generally either vertically arranged or horizontally arranged. Examples of vertically arranged machines would be U.S. Pat. Nos. 4,516,731 and 4,303,206. Examples of horizontally arranged machines are disclosed in U.S. Pat. Nos. 4,042,176 and 4,824,027.

The horizontally arranged deboning machine generally used in food processing is an apparatus that is linear in a horizontal plane and fully supported by an integral base member throughout its length. An auger is utilized to compress and convey the meat and bone material axially to a sieve screen wherein the compressed meat passes through the sieve screen and the bony material is conveyed through an outlet at the end of the sieve screen. The deboning apparatus disclosed in U.S. Pat. Nos. 4,042,176 and 4,824,027 provide: a horizontal, one-piece base member that is fully supportive of all the operating components of the apparatus, a motor, an auger having multiple and separable sections, a direct drive linkage between motor and auger via a thrust bearing for axial rotation of the auger, a pressure housing, a/k/a feed can, and a perforated housing, i.e., screen, about the auger, and a discharge end.

In normal operation a meat-bone mixture is fed into the infeed end of the perforated housing from an adjoining pressure housing. Separation of meat from bone solids is effected within the perforated housing section with the meat extruding or exuding through small orifices in the perforated housing while bone solids and sinews leave the discharge end of the perforated housing in compacted condition.

Because of the operational nature of deboning apparatus in the food processing industry, the equipment used is subject to substantial stresses. The drive motor torque required for deboning processes require sturdy and heavy equipment components. The stresses on the equipment contained within a deboning apparatus necessitate frequent maintenance. The feed can itself typically must be replaced every three to four months. The machines used in the deboning process must also be dismantled and cleaned daily to prevent contamination of the strained food product. Horizontally arranged machines built according to the principles of the above patents are difficult to dismantle. The weight, size and difficulty in disassembling and reassembling the components of these machines give rise to the potential for serious injuries to maintenance and cleaning personnel.

SUMMARY OF THE INVENTION

In view of the foregoing disadvantages inherent in the known types of devices now present in the prior art, the present invention provides an improved meat deboning apparatus of the horizontally-arranged type, which is linear in a horizontal plane and fully supported by an integral base member throughout its length. As such, the general purpose of the present invention, which will be described subsequently in greater detail, is to provide an apparatus which is easy to maintain and clean, and has safer handling characteristics.

To attain these objectives, the present invention provides a number of improvements which make the present invention simpler, more efficient and less expensive to maintain, as well as considerably safer. Among the improvements made is the elimination of the prior art one-piece feed can and replacement with a split feed can with a replaceable insert. The split feed can of the present invention has a bottom half and a removeable top half. A replaceable insert is contained within. The insert is replaced by removing the top half of the feed can, removing the old insert and replacing it with a new insert. Because the feed can top half is removeable, a one-piece auger may also be used rather than the multiple-sectioned augers required by the pressure housings of the prior art. The thrust bearing and bearinged pillow blocks of the prior art are replaced with spherical roller bearing pillow blocks, thereby eliminating the need for a thrust bearing and its associated housing. The present invention also provides a transfer tube about the perforated housing, i.e., screen, of the prior art. This accomplishes several objectives. The prior art perforated housing screens are open and strained material drops down from the screen to a receptacle. Sanitation and airborne contaminants are a problem with this technique. The present invention transfer tube provides a sanitary and relatively contaminant-free sleeve over the prior art screen and provides means for channeling the strained material in a number of directions without the unidirectional gravitational reliance of prior art deboners. The present invention also adds a third set of supports for the base, thereby increasing stability and safety to the deboning apparatus.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF THE INVENTION

Figure 1:
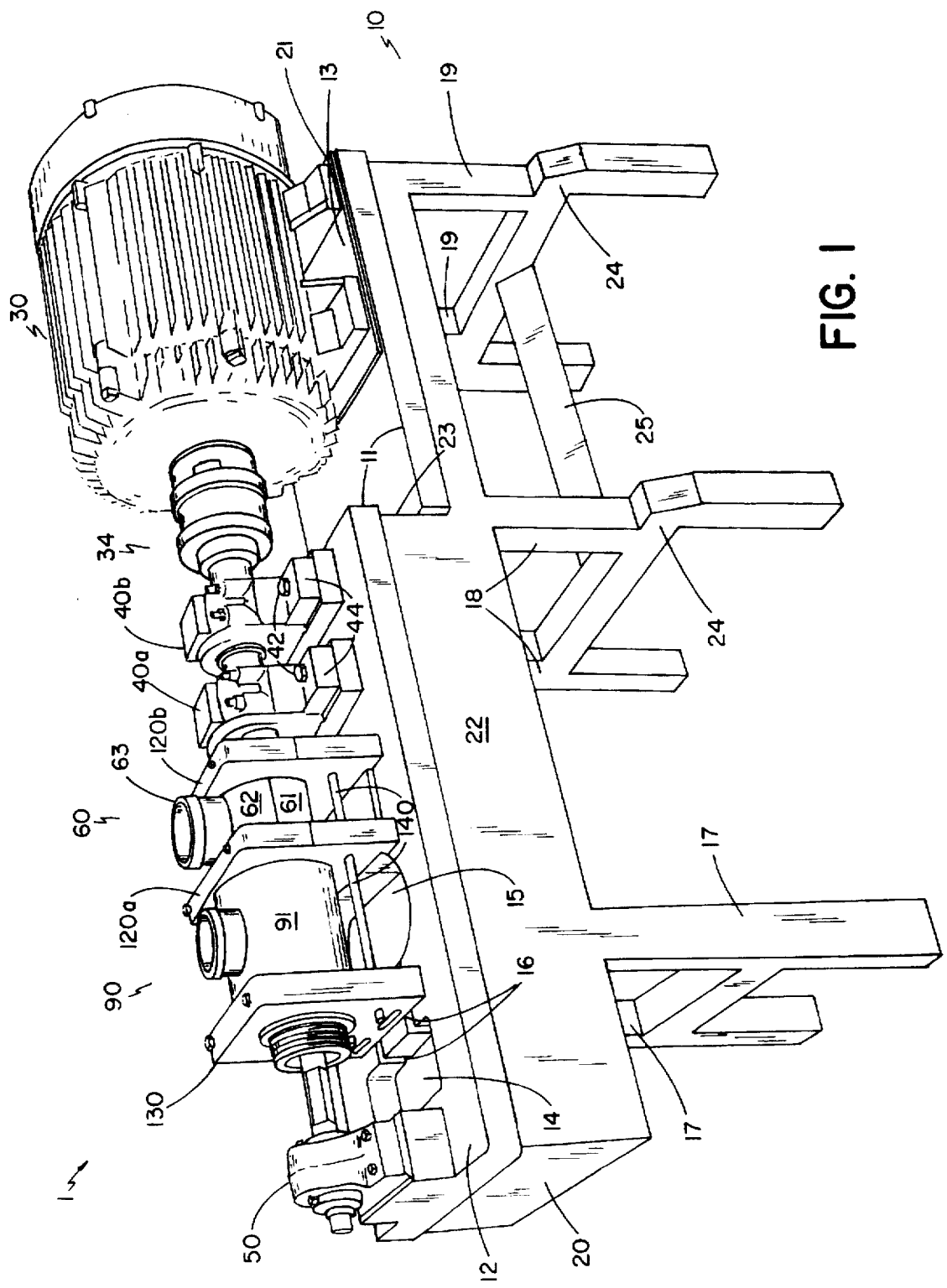
FIG. 1 is a perspective view of the improved deboning apparatus of the present invention.
Figure 2:
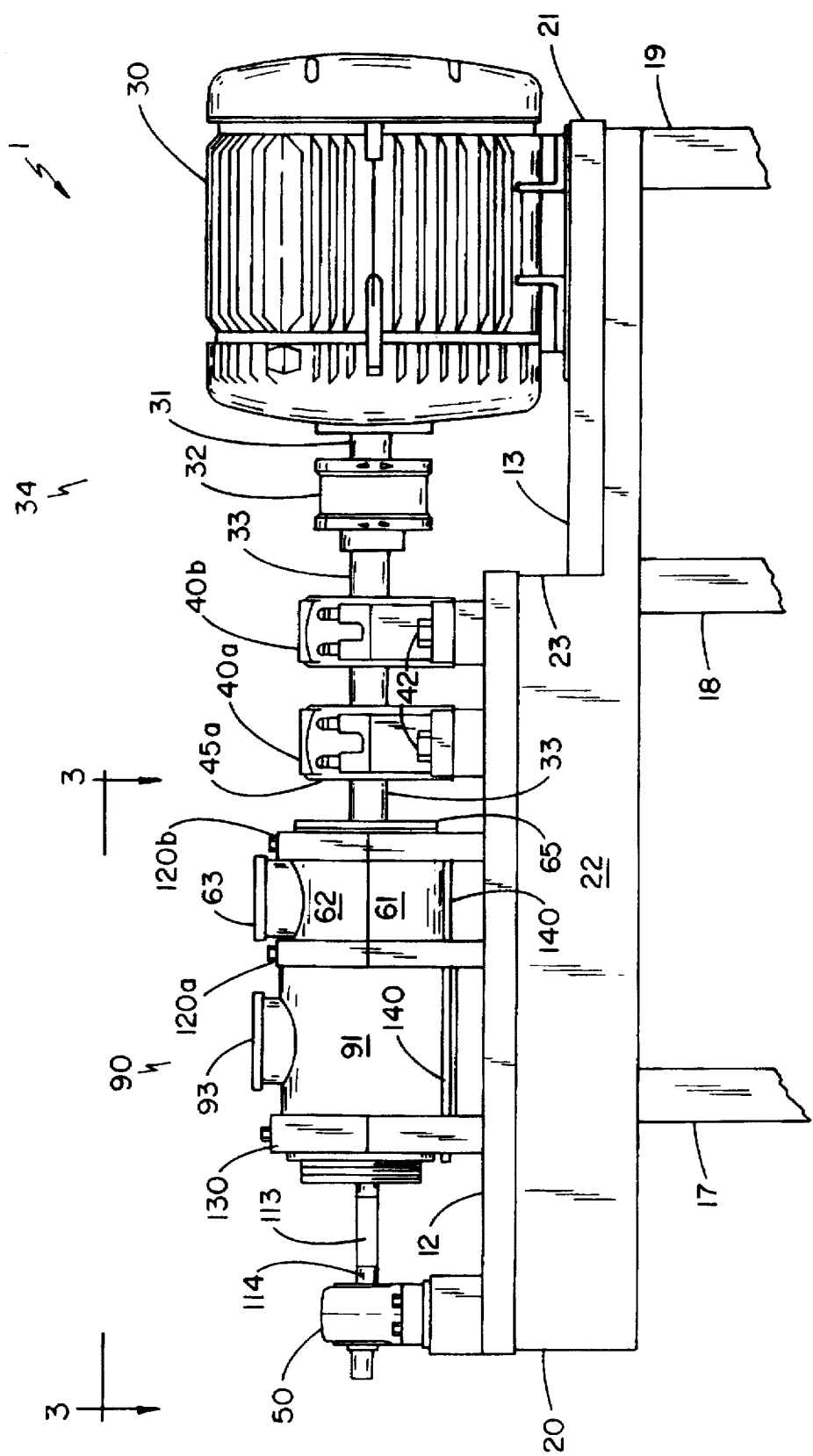
FIG. 2 is elevational view of the apparatus of FIG. 1.
Figures 3, 3A:
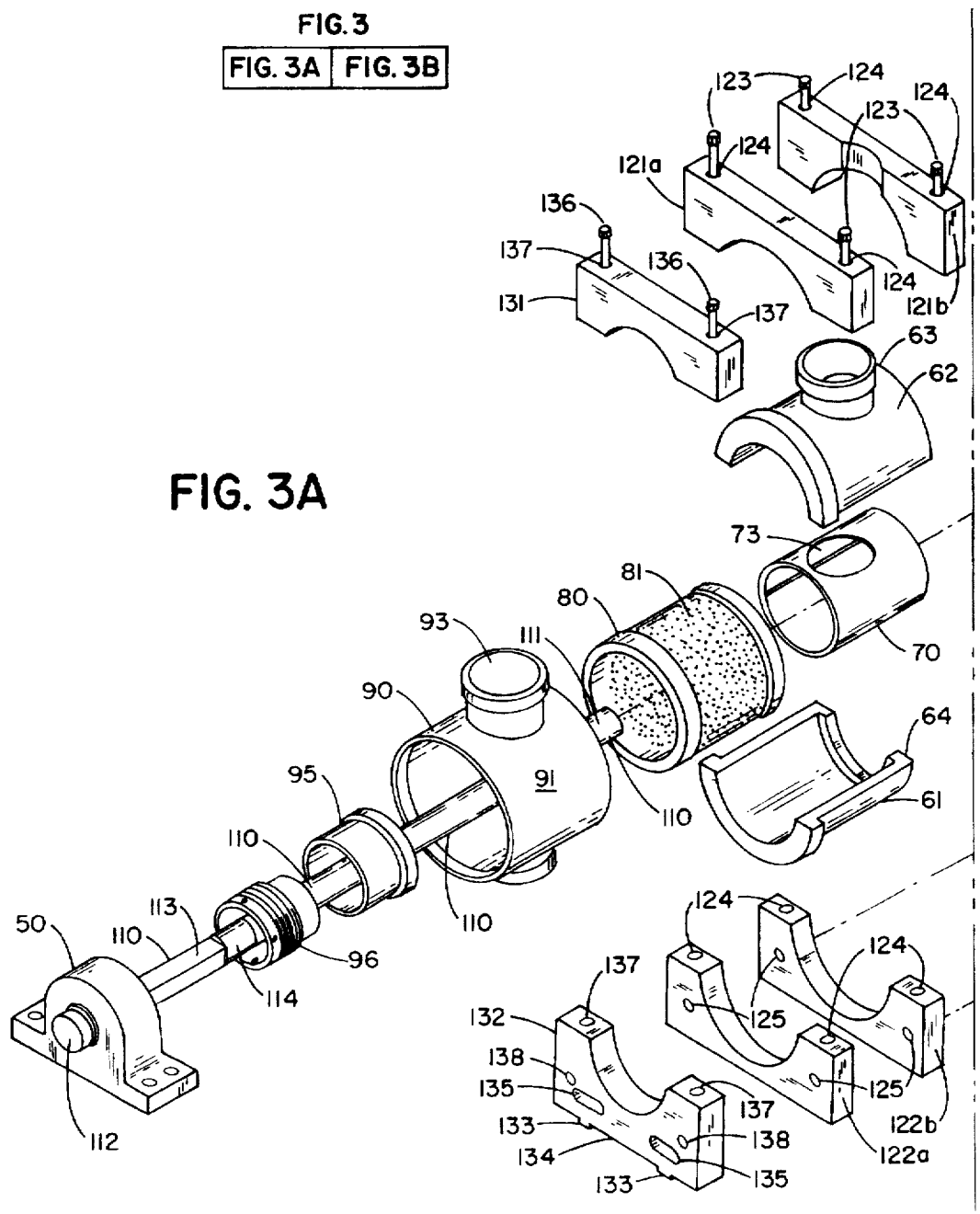
FIG. 3 is a partially exploded view of the apparatus along the line 3—3 of FIG 2.
Figure 4:
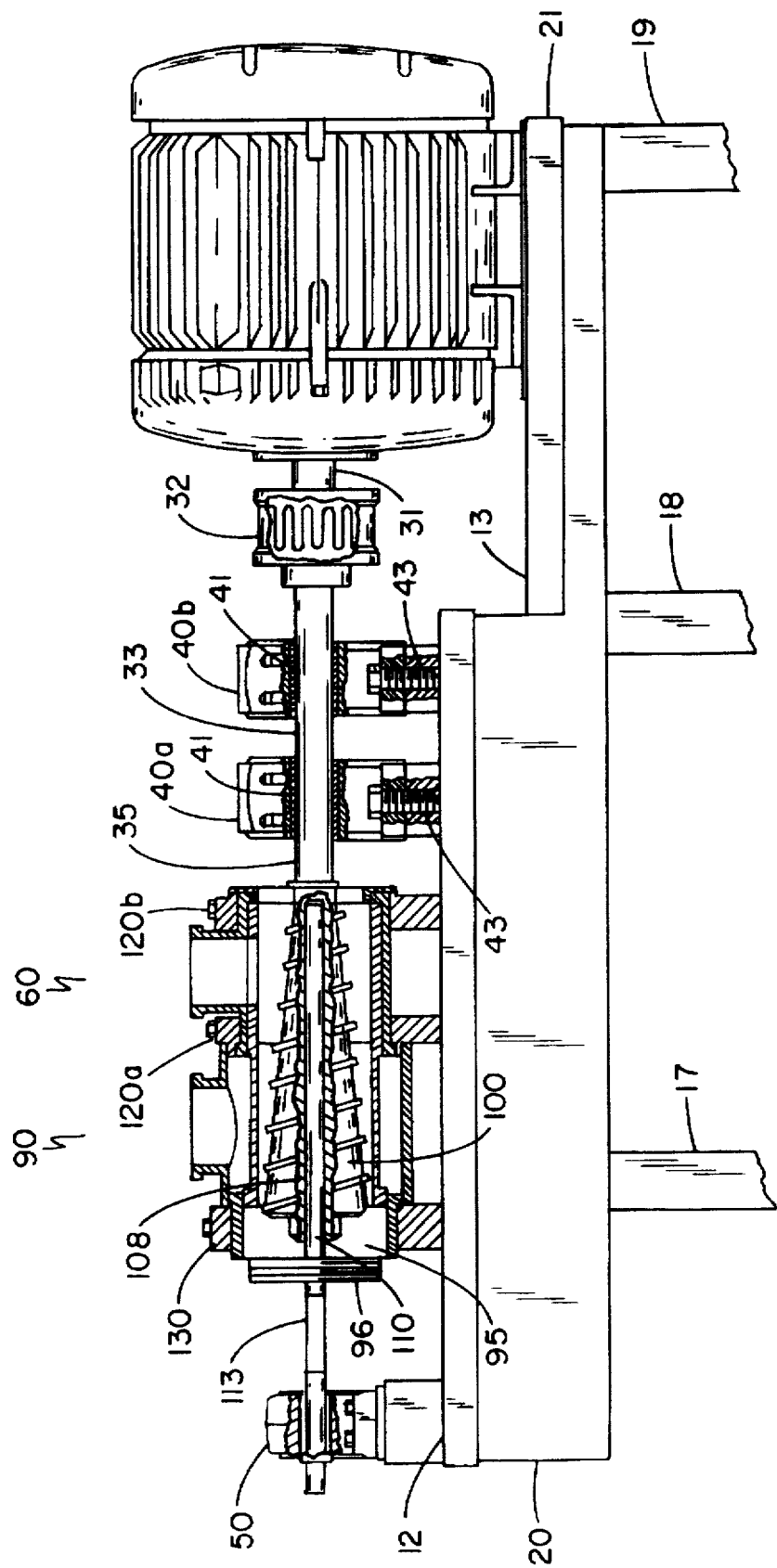
FIG. 4 is a partial transverse sectional view of the apparatus of FIG. 2.

Referring to the drawings in detail wherein like elements are indicated by like numerals, there is shown an embodiment of the invention 1 incorporating an improved meat deboning apparatus. The apparatus 1 is comprised of a generally horizontal base table 10, a motor 30 mounted on the table 10, a split feed can 60 with a removable insert 70, cylindrical screen 80, transfer tube 90 over said screen 80, a one-piece feed and compression auger 100 concentrically position within said insert 70 and screen 80 and joined to said motor 30 by means of a solid, cylindrical direct drive shaft 34.

The base table 10 has a generally rectangular shape and is made preferably from stainless steel. This provides an easily cleaned and sanitized surface while providing the strength necessary to support the apparatus 1. The table 10 has a front 20, rear 21, two sides 22, and a stepped top 11 with an upper level 12 and lower level 13. The longitudinal axis of the table 10 runs from front 20 to rear 21. The apparatus of the present invention will be directionally defined as forward/distal being toward the table front 20 and rearward/proximal being toward the table rear 21.

The table upper level 12 extends from the front end 20 rearward to the lower level 13. The lower level 13 extends from the rear end 21 forward to the upper level 12. The junction of the lower and upper levels 13, 12 forms a line 23 perpendicular to the longitudinal axis of the table. The upper level 12 has two openings, a first opening 14 and a second opening 15, formed in the table top 11. The two openings 14, 15 are interconnected by channeled grooves 16 whose longitudinal axis are coincident with the longitudinal axis of the table 10. The openings 14, 15 are generally rectangular in shape and each have a longitudinal axis perpendicular to the longitudinal axis of the table 10. Extending downwardly from the table top 11 are three pairs of legs, a forward pair 17, an intermediate pair 18, and a rear pair 19. The intermediate and rear pairs 18, 19 terminate in downwardly extending U-shaped braces 24. A bracing member 25 interconnects the U-shaped braces 24. The rear pair 19 of legs extend downwardly from the rear-sides 21, 22 of the table 10. The intermediate pair 18 of legs extend downward from the table sides 22 at the line 23 formed by the junction of the upper and lower table top levels 12, 13. The forward pair 17 of legs extend downwardly from the table sides 22 from positions approximately parallel to the channeled grooves 16.

The motor 30 is preferably a high efficiency electric motor. In the preferred embodiment of the invention a 75 horsepower motor generating up to 1,160 rpm or a 100 horsepower motor generating up to 1,760 rpm is used, although lower horse power motors may be used as well. The motor 30 is mounted on the table top lower level 13 near to the table rear 21. The motor's longitudinal axis is parallel to the table's longitudinal axis. The motor drive shaft 34 has two segments, a proximal segment 31 and a distal segment 33 interconnected by means of a spring coupling 32. The motor drive shaft 34 protrudes forwardly and centrally toward the table front 20 in a plane parallel to the plane of the table top 11. The motor drive shaft longitudinal axis is parallel to the central longitudinal axis of the table 10. The proximal motor shaft segment 31 extends immediately from the motor 30 and terminates in the spring coupling 32. The distal motor shaft segment 33 extends forwardly from the spring coupling 32. The spring coupling 32 reduces the torque strain on the motor drive shaft 34 at start-up by providing resilience and some slippage to the motor drive shaft 34 as it first encounters the torque load of the apparatus 1.

The distal motor shaft segment 33 is supported by two split pillow blocks 40, a forward block 40a and a rearward block 40b, having spherical, self-aligning, roller bearings. The pillow blocks 40 used in this invention are true pillow blocks mounted by holding bolts 42 through slotted mounting holes 43 in the pillow block bases 44 to the table top upper level 12. The rearward block 40b is positioned nearly at the junction 23 between table upper and lower levels 12, 13. Prior art deboning apparatus, such as that disclosed in U.S. Pat. No. 4,042,176, provide a support piece, termed an "integral pillow block", as part of the table top cast. This cast piece has a surface with a bore into which is mounted a bearing. Whenever there is a problem with the "integral pillow block", the entire table must be replaced. The instant invention merely requires the unbolting of the defective pillow block and replacement with a new one. The pillow blocks 40 of the present invention also eliminate the need for the prior art thrust bearing. The prior art thrust bearing is required to absorb any longitudinal thrust that may be generated through the cooperative operation between the auger means and the various associated mechanisms of prior art deboning apparatus. The pillow blocks 40 of the present invention contain tapered bushings (or sleeves) 41 which prevent back shaft movement, i.e., movement of the drive shaft 34 longitudinally back into the motor 10. The slotted mounting holes 43 assist in the proper positioning of the pillow blocks 40, an adjustment capability not available in prior art single unit casts.

The distal motor shaft segment 33 extends forwardly from the spring coupling 32 through the rearward pillow block 40b and the forward pillow block 40a. The forward section 35 of the distal motor shaft segment 33 has a cylindrical bore hole 36 formed therein with internal threads 37. The bore hole's longitudinal and axial axis are coincident with those of the distal shaft segment 33.

Threadingly engaged to the distal motor shaft segment bore hole 36 is the present invention's one-piece, feed and compression auger 100. The auger 100 has a longitudinal axis extending linearly forward from the longitudinal axis of the motor drive shaft 34. The auger 100 has two ends, a proximal end 101 and a distal end 102. The auger's proximal end 101 is externally and correspondingly threaded for fit with the internal threads 37 of the distal shaft segment bore hole 36. The auger proximal end 101 may also be provided with a shoulder 103 for biasing against the foremost end 38 of the distal shaft segment forward section 35. The auger 100 may be roughly divided into two longitudinal segments, a rearward feed segment 104 and a forward compression segment 105. The auger 100 has a significantly increasing diametrical dimension along its length, from the auger proximal end 101 to the auger distal end 102. Integrally formed about the auger external surface 106 is a continuous helical vane 107 adapted to move matter in a forward direction as the auger 100 is turned. An internal cylindrical, aperture 108 along the center longitudinal axis of the auger 100 is bored out along the auger's entire length. An auger shaft 110 is slip fitted through the length of the auger central aperture 108 so that the auger shaft proximal end 111 abuts the internal transverse bore hole face 39. The combination of the one-piece auger 100 with an auger shaft 110 extending centrally through the entire auger 100 length strengthens the auger and eliminates radial flex in the auger unit. Prior art devices, such as that disclosed in U.S. Pat. Nos. Nos. 4,042,176 and 4,824,027, use multi-sectioned augers with drive pins holding auger sections together. The auger shaft disclosed in these patents is only partially fitted into the auger. There tends to be radial flexing in this arrangement as well as torsional twisting on the drive pins which can cause pin shearing. Because of the above-described movement in prior art augers, close tolerances between the auger and screens are difficult to maintain. The present invention arrangement allows much closer tolerances, thereby providing a more efficient deboning process. Top prior art efficiencies for edible meat recovery are in the 62–65% range. The present invention routinely obtains a 70% recovery with efficiencies as high as 71.9% being measured.

The auger shaft distal section 112 protrudes from the auger distal end 102 to and through a roller bearing, adapter-mounted end pillow block 50. The auger shaft distal section 112 has four longitudinal flat surfaces 113 formed on the shaft surface 114. Waste product from a deboner is generally outputted over a deboner's auger shaft distal section. Since the waste product is very dry, it tends to accumulate on the auger shaft in prior art deboners. The flat surfaces 113 are formed radially at 90° increments and break up the waste product thereby preventing accumulations along the auger shaft distal section 112.

As stated above the auger 100 may be considered as having two longitudinal segments, a rearward feed segment 104 and a forward compression segment 105. The auger's rearward feed segment 104 is radially surrounded by the invention's split feed can 60 with a removable and disposable insert 70 contained within. This is a significant and unique feature of the present invention and permits the auger-auger shaft arrangement 100–110 described above. The split feed can 60 is comprised of two longitudinally-split, half-cylinder segments, a base segment 61 and a feed segment 62. The feed segment 62 has a circular infeed sleeve 63 formed on its surface through which the ground bone laden material yet to be deboned enters into the feed can 60. A cylindrical disposable insert 70 with an aperture 73 corresponding to the infeed sleeve 63 is positioned within the can 60 over the auger's rearward feed segment 104. The feed can 60 is held in place by two split support blocks, a forward block 120a and a rearward block 120b. A flanged housing 65 is mounted on the feed can rearmost end 64 thereby locking the feed can 60 to the rearward support block 120b. The direct drive distal segment 33 joins the auger proximal end 101 at the rearward support block 120b. A packing insert 66 and a seal packing insert 67 are applied to the auger proximal end 101 within the flanged housing 65.

In prior art devices, when the inside of the feed can wears down the entire unit must be replaced. This is an expensive replacement. As a result, users of prior art deboners tend to run their units long past a point where efficient operation can be maintained. However, with the present invention, only the insert 70 needs to be replaced. The present invention insert 70 lasts as long as prior art pressure housings, but cost only ¼ to ⅓ as much. Consequently, the insert of the present invention can be replaced more often and the present invention can be run closer to tolerances, and thereby with greater efficiency.

The support blocks 120a and 120b are each formed into an upper half 121a, 121b and a lower half 122a, 122b. The lower halves 122a, 122b are attached to the table top upper level 12. The upper and lower halves 121a, 122a and 121b, 122b are held together by fasteners 123 inserted into corresponding vertical openings 124 formed in the sides of each half.

The auger's forward compression segment 105 is radially surrounded by a cylindrical screen 80 which in turn is enclosed within a cylindrical transfer tube 90. The screen 80 and tube 90 are held in position by means of the forward support block 120a and a support member 130 slidably mounted upon the channeled grooves 16 interconnecting the two openings 14, 15 in the table top upper level 12. The auger compression segment 105 expresses the meat material separated from boning components through the screen 80. The cylindrical transfer tube 90 surrounding the screen 80 captures the meat material and passes it through a circular outfeed sleeve 93 formed on the transfer tube's surface 91, thereby channeling the strained material in a desired direction without the unidirectional gravitational reliance of prior art deboners. Pressure from the turning auger 100 is sufficient to move the meat material through the outfeed sleeve 93. The screen 80 contains a series of predrilled apertures 81 therethrough. The screen 80 has identical forward and rearward ends thereby making the screen 80 reversible. The rearward end of the screen bears the brunt of wear. When a screen 80 of the present invention begins to wear, it is removed and re-installed with its ends reversed, thereby doubling the life of a present invention screen.

The bony material not passed through the screen apertures 81 exits through a bone exit can 95 surrounding the auger distal end 102 and clamped in place by the support member 130. A hollow compression ring 96 is fitted into the bone exit can 95 and fits over the auger distal end 102.

The slidable support member 130 is formed into an upper half 131 and a lower half 132. The lower half 132 has two rectangular protrusions 133 extending downwardly from its bottom surface 134. The protrusions 133 correspond in shape to the channeled grooves 16 interconnecting the two openings 14, 15 in the table top upper level 12. The protrusions 133 are fitted into the grooves 16 thereby setting a proper transverse position for the support member 130. Fastening means (not shown) for locking the member 130 into a proper position along the table's longitudinal axis are inserted into apertures 135 formed in the member lower half 132 above the protrusions 133. The upper and lower halves 131, 132 are held together by fasteners 136 inserted into corresponding vertical openings 137 formed in the sides of each half.

Each side of the split support block lower halves 122a, 122b and support member lower half 132 has a horizontal opening 125a, 125b, 138 formed therein with a longitudinal axis parallel to the table's longitudinal axis. The openings on each side are concentrically positioned with respect to their longitudinal axis. An alignment shaft 140 is placed into each side's set of openings 125a, 125b, 138. The alignment shafts 140 ensure the transverse alignment of the support blocks 120a, 120b and support member 130 with each other.

It is understood that the above-described embodiment is merely illustrative of the application. Other embodiments may be readily devised by those skilled in the art which will embody the principles of the invention and fall within the spirit and scope thereof.

I claim:

1. An improved meat deboning apparatus of the type disposing an auger means through a pressure feed can and a cylindrical screen housing, and having motor means connecting to said auger means for inducing its direct drive in rotation during functioning of the apparatus, said motor means, auger means, pressure feed can and screen housing being fully supported by a base member, said feed can being of the type having an infeed region for depositing bone laden material therein, conveying said boney material by means of rotation of said auger means within the feed can to achieve its pre-pressurization before its transfer into the screen housing for therein effecting substantial separation of the bone from the material as said material passes through the screen, and conveying the residue bone from the discharge end of the screen housing, the improvement comprising:

a pressure feed can comprised of a split feed can having two longitudinally-split, half-cylinder segments, a bottom half base segment and a removable top half feed segment, said feed segment having a circular infeed sleeve formed on its surface through which the ground bone laden material yet to be deboned enters into the feed can;

a hollow replaceable cylindrical insert contained within said split feed can, said insert having an aperture corresponding to the feed can infeed sleeve;

an auger means comprised of a one-piece feed and compression auger divided into two longitudinal

7 segments, a rearward feed segment and a forward compression segment, said auger having a proximal end and a distal end, said auger having a significantly increasing diametrical dimension along its length, from the auger proximal end to the auger distal end, said auger being disposed such that said feed segment is disposed within said insert and said compression segment is disposed within said screen housing, said auger also having a cylindrical aperture bored out along its center longitudinal axis;

a motor drive shaft interconnecting said motor means with said auger proximal end;

two split pillow blocks, a forward block and a rearward block, having spherical, self-aligning, roller bearings, said blocks attached to said base and arranged to support said motor shaft;

an auger shaft having a proximal end and a distal end, said shaft being slip fitted through the length of the auger central aperture so that the proximal end of the auger shaft abuts the said motor shaft;

a roller bearing, adapter-mounted end pillow block attached to said base and arranged to support the distal end of said auger shaft.

2. An improved meat deboning apparatus as described in claim 1, wherein:

said auger shaft distal section has four flat surfaces formed on the shaft surface.

3. An improved deboning apparatus as described in claim 2, further comprising:

a cylindrical transfer tube surrounding the cylindrical screen housing adapted to capture screened meat material and pass it through a circular outfeed sleeve formed on its surface, thereby channeling the strained material in a desired direction.

4. An improved deboning apparatus as described in claim 3, wherein:

the screen housing has identical forward and rearward ends thereby making the screen reversible.

5. An improved deboning apparatus as described in claim 4, wherein:

said base member is a generally rectangular table made from stainless steel, said table having a front, rear, two sides, and a stepped top with an upper level and lower level, said table having a longitudinal axis running from front to rear.

6. An improved deboning apparatus as described in claim 5, wherein:

said table upper level extends from the front end rearward to said lower level, and said lower level extends from the rear end forward to the upper level, the junction of the lower and upper levels forming a line perpendicular to the longitudinal axis of the table, said upper level having two openings, a first opening and a second opening, formed in the table top, said two openings being interconnected by channeled grooves each having a longitudinal axis coincident with the longitudinal axis of the table, said openings being generally rectangular in shape and each having a longitudinal axis perpendicular to the longitudinal axis of the table.

7. An improved deboning apparatus as described in claim 6, wherein:

said table has extending downwardly from the table top three pairs of legs, a forward pair, an intermediate pair, and a rear pair, said intermediate and rear pairs terminating in downwardly extending U-shaped braces, said

8

U-shaped braces being interconnected by a bracing member, said rear pair of legs extending downwardly from the rear-sides of the table, said intermediate pair of legs extending downwardly from the table sides at the line formed by the junction of the upper and lower table top levels, and said forward pair of legs extending downwardly from the table sides from positions approximately parallel to the said channeled grooves.

8. An improved deboning apparatus as described in claim 7, wherein:

said motor means is a high efficiency electric motor.

9. An improved deboning apparatus as described in claim 8, wherein:

said motor is mounted on the table top lower level near to the table rear, said motor having a longitudinal axis parallel with the table's longitudinal axis.

10. An improved deboning apparatus as described in claim 9, wherein:

said motor drive shaft has two segments, a proximal segment and a distal segment, said segments being interconnected by means of a spring coupling, said motor drive shaft protruding forwardly and centrally toward the table front in a plane parallel to the plane of the table top, said motor drive shaft having a longitudinal axis parallel to a central longitudinal axis of the table, said proximal motor shaft segment extending immediately from the motor and terminatings in the spring coupling, and said distal motor shaft segment extending forwardly from the spring coupling, wherein said spring coupling is adapted to reduce torque strain on the motor drive shaft at start-up by providing resilience and some slippage to the motor drive shaft as it first encounters a torque load from the apparatus.

11. An improved deboning apparatus as described in claim 10, wherein:

said split pillow blocks contain tapered bushings adapted to prevent movement of the drive shaft longitudinally back into the motor.

12. An improved deboning apparatus as described in claim 11, wherein:

said split pillow blocks are attached to said upper table top level, said rearward block being positioned nearly at the junction between table upper and lower levels, said split pillow blocks supporting said distal motor shaft segment.

13. An improved deboning apparatus as described in claim 12, wherein:

said distal motor shaft segment extends forwardly from the spring coupling through the rearward pillow block and the forward pillow block, said distal motor shaft segment having a forward section with a cylindrical bore hole formed therein with internal threads, said bore hole having longitudinal and axial axis coincident with those of the distal shaft segment.

14. An improved deboning apparatus as described in claim 13, wherein:

said auger has a longitudinal axis extending linearly forward from the longitudinal axis of the motor drive shaft, said auger's proximal end being externally and correspondingly threaded for fit with the internal threads of the distal shaft segment bore hole, said auger being threadingly engaged to the distal motor shaft segment bore hole.

15. An improved deboning apparatus as described in claim 14, wherein:

said auger shaft is slip fitted through the length of the auger central aperture so that the auger shaft proximal end abuts the internal transverse bore hole face.

16. An improved deboning apparatus as described in claim 15. wherein:

said auger shaft distal section protrudes from the auger distal end to and through a roller bearing, adapter-mounted end pillow block.

17. An improved deboning apparatus as described in claim 16. further comprising:

two split support blocks, a forward block and a rearward block, holding said feed can in place;

wherein said direct drive distal segment joins the auger proximal end at the rearward support block.

* * * * *